United States Patent [19]
Peled et al.

[11] Patent Number: 4,461,815
[45] Date of Patent: Jul. 24, 1984

[54] CA ELECTROCHEMICAL CELL

[75] Inventors: Emanuel Peled, Even Yehuda; Azieh Meitav, Rishon-Lecion, both of Israel

[73] Assignee: Ramot University Authority For Applied Research and Industrial Development Ltd., Tel-Aviv, Israel

[21] Appl. No.: 396,838

[22] Filed: Jul. 9, 1982

[30] Foreign Application Priority Data

Jul. 16, 1981 [IL] Israel .................................... 63336

[51] Int. Cl.³ .............................................. H01M 4/36
[52] U.S. Cl. .................................. 429/105; 429/196; 429/199
[58] Field of Search ............... 429/101, 105, 196, 199, 429/94

[56] References Cited

U.S. PATENT DOCUMENTS

| 4,177,329 | 12/1979 | Dey et al. | 429/196 X |
| 4,184,007 | 1/1980 | Urry | 429/196 X |
| 4,219,443 | 8/1980 | Klinedinst | 429/186 X |

Primary Examiner—Charles F. Lefevour
Attorney, Agent, or Firm—Toren, McGeady and Stanger

[57] ABSTRACT

There are provided electrochemical cells resistant to abusive charging and overdischarging which comprise an anode made of calcium or magnesium, an inert current collector and a liquid cathode constituted by an inorganic oxyhalide wherein there is dissolved a soluble calcium salt.

10 Claims, 7 Drawing Figures

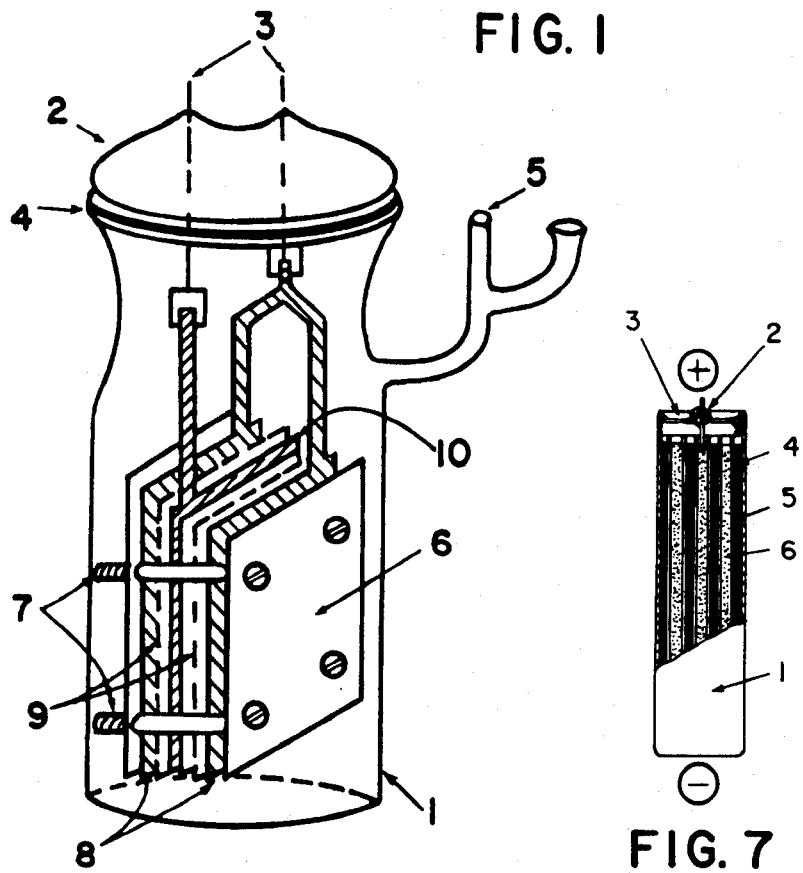
FIG. 1
FIG. 7
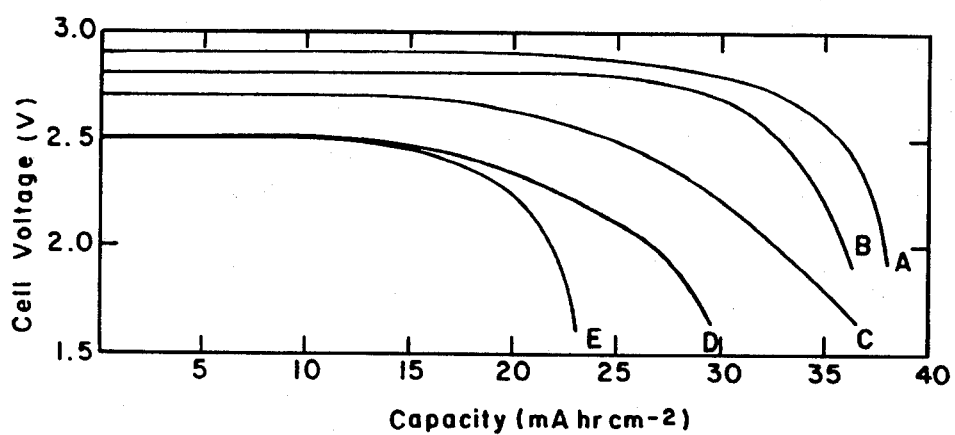
FIG. 2

CA ELECTROCHEMICAL CELL

FIELD OF THE INVENTION

The present invention relates to a novel electrochemical high-energy cell which is safe in use, and which even under conditions of abuse is not likely to create a hazard or to explode.

The novel cells are based on an alkaline earth metal anode selected from calcium, or a dischargeable alloy of same, practically devoid of an alkali metal in the alloy on a porous inert current collector and on the use of an inorganic oxyhalide solvent wherein there is dissolved a suitable calcium salt or mixture of calcium salts. The solvent of choice is thionyl chloride, which can also be termed as liquid cathode. The salt of choice which is dissolved in the oxyhalide is calcium aluminum chloride.

BACKGROUND OF THE INVENTION

The lithium-thionyl chloride cell has the highest energy density of commercially available primary cells. It has a very good low- and high-temperature performance, excellent shelf life and a very high power density in its high-rate configuration. However, the major obstacle to the commercialization of a high-rate type cell, and in particular, a high-rate multicell battery is its well known explosion hazard during reversal or charging. This hazard is common to all high-rate nonaqueous lithium batteries. Reversal of one or more cells or the charging of one row of cells by another row connected in parallel is likely to happen during deep discharge. The reason for this is that lithium is deposited at low over-potentials, on itself, or on a passivated cathode. The metallic lithium which deposits under these conditions is likely to have a large active surface area. At a high deposition rate, a powder-like lithium deposit can be formed. The presence of lithium powder in a thionyl-chloride cell can create a very hazardous condition. On prolonged reversals or charging of a lithium cell there is the danger of an internal short circuit due to lithium dendrite growth. This may lead to internal spark which can rapidly melt, or even evaporate, the lithium dendrite, thereby initiating a cell explosion. This explosion process is more likely to happen in a partially discharged cell where less electrolyte is available to cool the spark area.

U.S. Pat. Nos. 4,184,014, No. 4,093,784 and 4,042,756 and German Pat. No. 2,262,256, claim electrochemical cells having an alkali metal or alkaline earth metal as anode, an oxyhalide as solvent/cathode material and some unspecified electrolyte salt or electrolyte salt consisting of lithium as cation and an anion.

SUMMARY OF THE INVENTION

The present invention relates to a novel primary electrochemical high energy and power density cell. The novel cell has a high energy and power density, it has good storage properties and can be produced in a high-rate configuration without any danger of explosions on misuse of the cell.

The novel cell comprises an alkaline earth metal anode (preferably calcium or a dischargeable alloy thereof); a suitable inert current collector such as teflon-bonded carbon and a liquid cathode comprising an inorganic oxyhalide such as thionyl chloride wherein there is dissolved a suitable calcium salt as sole salt.

Calcium has a melting point of about 838° C., which is much higher than that of lithium (180.5° C.), and thus the probability that an internal spark will lead to melting or evaporation of calcium is much smaller than with lithium. Experiments have shown that, in practice, it is impossible to charge, or overdischarge, a Ca/Ca(AlCl$_4$)$_2$ thionyl chloride cell. The "charging" current density of a fresh cell is smaller than 0.1 mA cm$^{-2}$ up to a "charging" voltage of 30 V. A similar phenomenon was observed when a fully discharged cell (at 1 mA cm$^{-2}$) was overdischarged. Reverse voltage, or a "charging" voltage, higher than 40 volts were needed in order to drive a current density higher than 3mA cm$^{-2}$ through the cell. Under these conditions, massive evolution of SO$_2$ was observed while no evidence for calcium deposition on the carbon cathode (during reversal) was found.

Encouraging electrical performance of a half D size and of 600 Ah Ca/LiAlCl$_4$-thionyl chloride cells was recently demonstrated by R. Huggins et al, Proc. 29th Power Sources Symp, 1980, Atlantic City. The 600 Ah cells have been demonstrated to be safe to many test abuses in their low-surface-area versions. However, they were unsafe to bullet penetration in their high-surface-area version. Calcium-thionyl chloride cells based on Ca(AlCl$_4$)$_2$ electrolyte are basically safer than calcium cells based on LiAlCl$_4$ electrolyte.

Calcium and lithium-thionyl chloride cells belong to the family of Solid Electrolyte Interphase (SEI) nonaqueous batteries, U.S. Pat. No. 4,224,389 (1980). The batteries of this family have anodes which are always covered by a film which separates them from the solution. This film has the properties of a solid electrolyte and it is a very poor electronic conductor but a rather good ionic conductor.

In these batteries, the oxyhalide serves both as the solvent for the electrolyte and as a liquid cathode. The composition of the passivating layer of lithium is LiCl while that of Ca is CaCl$_2$. The transference number of Li$^+$(t$_+$) in LiCl at room temperature is about 1.

The rate-determining step (rds) for the deposition-dissolution process of lithium in thionyl chloride is the migration of lithium ions through the SEI. The mechanism of deposition dissolution of calcium or magnesium in thionyl chloride solutions is more complex as the CaCl$_2$ or MgCl$_2$ which covers the anode have t$_+$ values smaller than 1. During deposition of calcium, or magnesium in thionyl chloride solutions there is a blocking mechanism of the cationic current through the SEI. As a result the ionic resistivity of the SEI increases and a very high electric field is formed leading finally to the electrolytic breakdown of the SEI and to the reduction of the solvent.

The novel cells according to the present invention are based on a calcium-oxyhalide cathode in liquid form. It ought not to contain any appreciable quantity of lithium or other alkali metals. The use of calcium as sole cation ensures the safety of the cell during abuse while discharging the cell and during charging. This is to be contrasted with lithium salt oxyhalide cells which may explode when charged or overcharged under extreme conditions.

BRIEF DESCRIPTION OF THE DRAWING

FIG. 1 is a perspective view of a cell according to the invention.

FIGS. 2 and 3 are graphs depicting constant load discharge curves of cells according to the invention.

FIG. 7 is an elevational cross-section view of a cell according to the invention.

DESCRIPTION OF THE PREFERRED EMBODIMENTS

Figure 3:
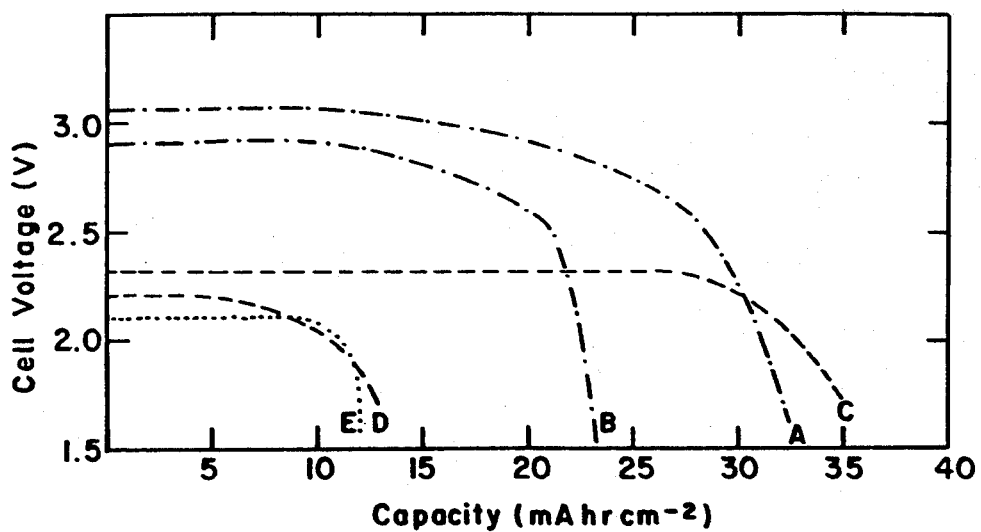

An experimental cell is illustrated in FIG. 1. This is a sandwich-type glass laboratory cell. This cell comprises a glass cell 1, a glass cover 2, tungsten rods 3 sealed in the glass cover, a Viton O-ring 4, a rotaflow stopcock 5, a stainless steel plate 6, stainless steel bolts 7, calcium anodes 8, a glass paper separator 9, and a carbon current collector 10. The liquid cathode is not shown.

The invention is further illustrated with reference to FIGS. 2 to 6. In these:

FIG. 2. Constant-load discharge curves of calcium "sandwich-like" cells having an optimum electrolyte concentration of 1.3 M Ca(AlCl$_4$)$_2$ at 25° C. A-273Ω; B-120Ω; C-56Ω; D-28Ω; E-22Ω.

FIG. 3. Constant-load discharge curves of calcium "sandwich-like" cells having an optimum electrolyte concentration. Cells discharged at 60° C. contained 1.3 M Ca(AlCl$_4$)$_2$; those discharged at −20° C. and −30° C. contained 0.7 M Ca(AlCl$_4$)$_2$.

A-48Ω, 60° C.; B-22Ω, 60° C.; C-280Ω, −20° C.; D-68Ω, −20° C.; E-120Ω, −30° C.

Figure 4:
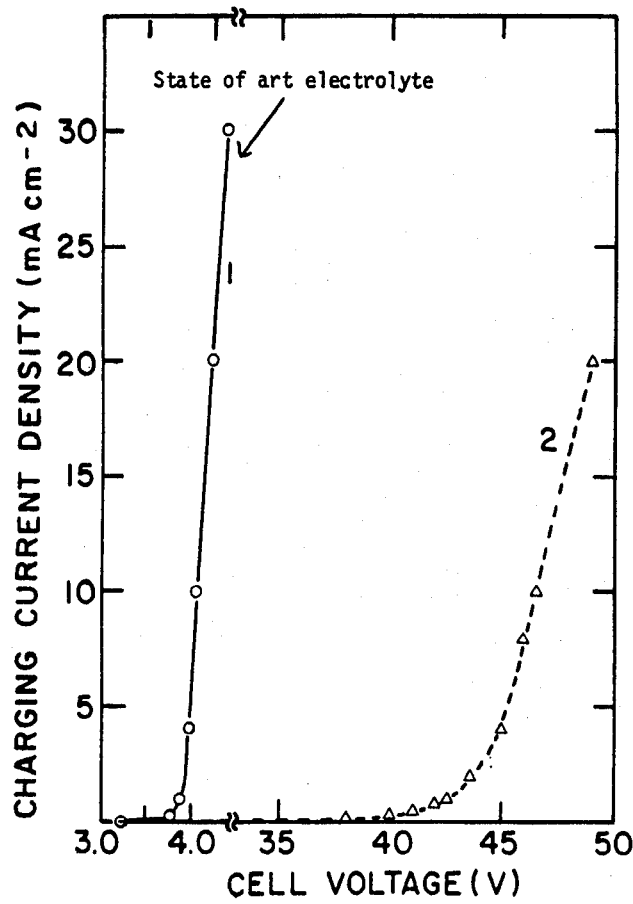
FIGS. 4 and 5 are graphs of current density as a function of cell voltage.

FIG. 4. A plot of charging-current density as a function of cell voltage for Ca/LiAlCl$_4$ and Ca/Ca(AlCl$_4$)$_2$ SOCl$_2$ cells. 1-1M LiAlCl$_4$; 2-1.3 M Ca(AlCl$_4$)$_2$.

Figure 5:
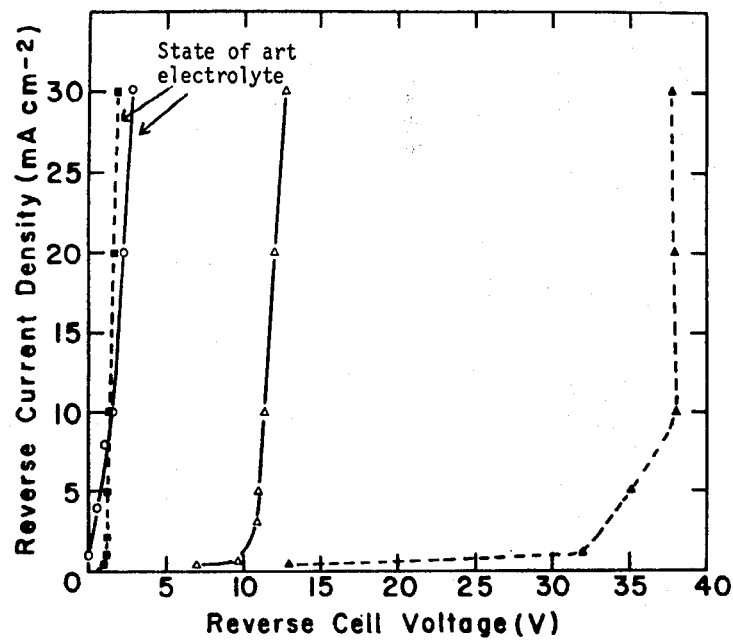

FIG. 5. Current density as a function of reverse cell voltage applied to calcium thionyl chloride cells which contained either 1 M LiAlCl$_4$ or 1.3 M Ca(AlCl$_4$)$_2$ electrolytes:

■ LiAlCl$_4$, discharged at 1 mA cm$^{-2}$ prior to reversal

O LiAlCl$_4$, discharged at 20 mA cm$^{-2}$ prior to reversal

▲ Ca(AlCl$_4$)$_2$, discharged at 1 mA cm$^{-2}$ prior to reversal

△ Ca(AlCl$_4$)$_2$, discharged at 20 mA cm$^{-2}$ prior to reversal.

Figure 6:
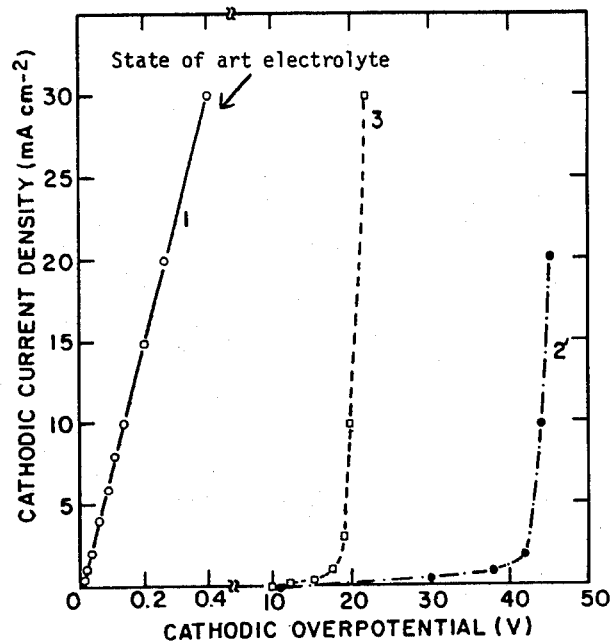
FIG. 6 is a graph of cathodic over potential vs. current density.

FIG. 6. Cathodic polarization (iR free) for inert electrodes in thionyl chloride solutions:
1-stainless steel: 1 M LiAlCl$_4$ vs. Li.R.E.
2-stainless steel: 1.3 M Ca(AlCl$_4$)$_2$ vs.Ca.R.E.
3-tungsten: 0.95 M Ca(AlCl$_4$)$_2$; vs. Ca.R.E.

FIG. 7. is an elevational cross-section through a rolled high-rate cell.

The electrolyte used in all investigations was prepared inside an argon-filled glove box by the addition of vacuum-sublimed AlCl$_3$ (Fluka, A.R.) to vacuum-distilled SOCl$_2$ (Merck zur Synthesis). Then vacuum-dried CaCl$_2$ (Baker A.R.) or LiCl (Merck A.R.) was added (ca. 10% excess), and the solution was refluxed for 24 hours. The exact concentration of Ca(AlCl$_4$)$_2$ or LiAlCl$_4$ solution was determined by atomic absorption.

The calcium metal (99%), 0.5 mm thick (ROC/RiC) was degreased in acetone and annealed at 450°–750° C. for two hours. Then it was transferred to a glove box where its surface was polished by sandpaper to an approximate thickness of 0.47 mm. The experiments were performed with the use of hermetically sealed glass cells. The cells for discharge had a "sandwich-like" construction. They contained a flat 1.1–1.2 mm thick Teflon-bonded carbon cathode which was inserted between two calcium foils which served as anodes. The electrode area, on both sides of the cathode, was ca. 10 cm$^2$. A non-woven 0.18 mm thick glass paper was inserted between the cathode and the anodes. The electrodes were supported by two stainless-steel plates, held together with four bolts tightened at constant force. The complete construction of this cell is presented in FIG. 1. The discharge experiments were performed by connecting the cell to a suitable resistor. The temperature was controlled (to ±0.5° C.) by immersing the cell in a thermostated oil bath (Refrigerated Circulating Bath, RTE-4, Neslab prod.). The discharge curves were recorded on a Telrad, Model 712 recorder. Charging, reversal or electrolysis were performed with a P.A.R. potentiostat/galvanostat Model 173.

The rolled electrode calcium/thionyl chloride high rate cell illustrated in FIG. 7, comprises in combination a can 1, a glass to metal seal 2, a can cover 3, a calcium anode 4, a separator 5, and a cathode 6. The calcium, separator and cathode are arranged as a "sandwich" and rolled into a helical configuration, the elevational cross-section of which is shown in this FIGURE.

Cell Discharge:

Fresh Ca/Ca(AlCl$_4$)$_2$ cells showed initial O.C.V. of 2.9–3.0 V, which increased to 3.20–3.25 V after 50–200 hours. Discharges were performed in flooded "sandwich-like" cells by loading on an appropriate resistor. Discharge plots taken at different temperatures and current densities are shown in FIGS. 2 and 3 for cells having an optimum electrolyte concentration. In these figures the cells were discharged at 60° C. and 25° C. contained 1.3 M Ca(AlCl$_4$)$_2$ and those discharged at −20° C. and −30° C. contained 0.7 M electrolyte. A cell containing a single anode, a 1.4 mm thick cathode and 1.3 M Ca(AlCl$_4$)$_2$ electrolyte was discharged at 25° C. at a nominal rate of 1 mA cm$^{-2}$. The calculated anode utilization was ca. 90% (the theoretical efficiency is based on anode mass, being 97 mA cm$^{-2}$ at an anode thickness of 0.47 mm).

After the discharge was completed, each cell was disassembled and inspected. The anodes of cells discharged at current densities higher than 5 mA cm$^{-2}$ at +60° C. and +25 C., and cells discharged at lower current densitites at −20° C. and −30° C., seemed to be almost unchanged with respect to the integrity and shape of the calcium. In cells discharged at lower densities (1, 2.5 mA cm$^{-2}$) at 60° C. and 25° C., a black precipitate was found between the anode and the cathode. However, in all inspections, no serious disintegration of the anodes except for a few pitting points on the edges, was observed.

At 25° C., a maximum capacity of 38 mA hr cm$^{-2}$ was obtained at 1 mA cm$^{-2}$. The cell can deliver about 60% of its capacity at the rather high rate of 11 mA cm$^{-2}$ (25° C.). Although flooded type cells were used, their "sandwich-like" construction makes it possible to estimate the performance of "jelly-roll" cells. For the particular thickness of the cathode and anode it is estimated that a D-size "jelly-roll" cell will have an active electrode area of about 250 cm$^2$. Therefore, the capacity of such a cell is expected to be about 9 Ahr at 0.5 A or about 5 Ahr at 2.5 A. The energy density of this system, for D-size "jelly-roll" cells, is expected to be 250–300 wh kg$^{-1}$, i.e. similar to that of the LiSO$_2$ cell.

The drawback of the state of the art calcium-thionyl chloride cell is its comparatively short shelf-life which results from calcium corrosion. This was reported by R. J. Staniewicz [J. Electrochem. Soc. 127, 782 (1980)] and by A. Meitav and E. Peled [ISE 31st Meeting, Venice, Italy - Sept. 1980]. Because of this, specific corrosion studies were undertaken using 0.95M Ca(AlCl$_4$)$_2$ solution with and without 3-4 w/o, SO$_2$, each solution containing either 99% of 99.9% pure calcium metal. After storage of two weeks at 65° C. the principal observations were that: (1) In SO$_2$ free solution, the 99% calcium undergoes pitting corrosion mainly on the edges of the sample which, in some instances, cause disintegration of the sample. (2) The 99.9% calcium retains its metallic integrity and appearance, with only slight salt precipitation on some areas. No disintegration or pitting points were observed. (3) In 3-4 w/o SO$_2$ solution with 99.9% calcium, similar results as in (2) were obtained with somewhat smaller salt precipitation. This demonstrates that according to the present invention, the shelflife problem is solved by using a puriss calcium anode (99.9%), pure and dry electrolyte, with further improvement by the addition of 3-4% SO$_2$ to the electrolyte.

Supplementary to the corrosion alleviation by SO$_2$, its addition to the electrolyte improves the conductivity of the electrolyte and the cell performance.

Safety Tests:

Several "sandwich-like" calcium cells containing either state of art electrolyte - 1 M LiAlCl$_4$, or 1.3 M Ca(AlCl$_4$)$_2$ electrolyte according to the present invention were similarly charged or overdischarged at 0.1-30 mA cm$^{-2}$. Cells containing either Ca/LiAlCl$_4$ or Ca/Ca(AlCl$_4$)$_2$ were charged at current density of 10 mA cm$^{-2}$. The voltage of the cells containing Ca(AlCl$_4$)$_2$ electrolyte rose rapidly to $-45$ volts. This was accompanied by massive gas evolution. When the current was turned off, the cell voltage dropped to 3.7-4.0 volts during 0.1-0.2 sec. and then decreased further but more slowly (1-2 minutes) to the usual O.C.V. (3.0-3.2 V).

Prolonged potentiostatic charging of Ca/Ca(AlCl$_4$)$_2$ cells was carried out. The cells were charged at a constant voltage of 30 volts for 30 hours. The initial current density was ca. 0.2 mA cm$^{-2}$ which dropped to 80-100 $\mu$A cm$^{-2}$ after 5-10 minutes decreasing further to 10-20 $\mu$A cm$^{-2}$ after 1-2 hours, then remaining almost constant at this level.

Charging of cells containing LiAlCl$_4$-state of art electrolyte showed a significantly different behavior. The charging voltage of these cells was relatively low (ca. 4 volts) and no gas evolution was observed. When the current was turned off, the O.C.V. was 3.7-4.0 volts and decreased slowly to 3.65-3.7 V where it remained constant for a relatively long period of time, (which depends on the charge). FIG. 4 shows the current density as a function of charging voltage for cells containing state of art LiAlCl$_4$ (curve 1) and Ca(AlCl$_4$)$_2$ (curve 2) electrolytes.

Cathode-limited cells containing each of these electrolytes were fully discharged at 1 mA cm$^{-2}$ or 20 (mA cm)$^{-2}$ and then a further discharge was forced by an external power supply. When low reversal currents (0.5-5 mA cm$^{-2}$) were applied to cells containing Ca(AlCl$_4$)$_2$, the cell voltage changed rapidly to $-15$ V, then increased monotonically for about thirty minutes up to 30-40 volts. When higher current densities were applied, the reverse voltage rose immediately to ca. $-40$ volts and massive evolution of gas occurred. In all cases, when the current was turned off, the cell voltage fell rapidly (less than 0.1 sec.) to $+2.5$ V. Fully discharged Ca(AlCl$_4$)$_2$ cells were overdischarged potentiostatically for 24 hours at a constant voltage of 35 volts (at room temperature). The initial current density was 20-30 mA cm$^{-2}$ decreasing to 80-100 $\mu$A cm$^{-2}$ after 3-5 hours.

Cells containing state of art LiAlCl$_4$ electrolyte showed a significantly different behavior on reversal tests. The reverse voltages were relatively low, not exceeding 3 volts at a current density of 30 mA cm$^{-2}$. In contrast to this invention (Ca/Ca(AlCl$_4$)$_2$ cells), Ca/LiAlCl$_4$ cells showed a very steady reverse cell voltage at all current densities and no gas evolution was observed. When the current was turned off, the cell voltage was about 0.5 V and remained at this value for up to several hours (depending on the duration of reversal test). FIG. 5 shows the current density vs. the reverse cell voltage for cells containing state of art LiAlCl$_4$ or Ca(AlCl$_4$)$_2$ electrolyte, each fully discharged at 1 or 20 mA cm$^{-2}$, prior to the reversal test.

Electrodeposition of Calcium and Lithium

The possibility of depositing calcium or lithium on a cathodically polarized electrode was further investigated by assembling cells with a three-electrode configuration. The cells consisted of a cylindrical calcium or lithium counter electrode, a calcium or lithium reference electrode a stainless steel working electrode and contained either 1.3 M Ca(AlCl$_4$)$_2$ or 1 M LiAlCl$_4$ electrolytes respectively. Also, one cell was assembled with a tungsten working electrode and calcium reference and counter electrodes. FIG. 6 shows the current density as a function of cathodic potential for cells containing LiAlCl$_4$ (curve 1) and Ca(AlCl$_4$)$_2$ (curves 2 and 3). The cathodic overpotentials on the stainless-steel electrode in LiAlCl$_4$ electrolyte were very low and no gas evolution was observed, even at 30 mA cm$^{-2}$. After the cathodic-polarization test, the potential of the stainless-steel electrode vs. Li.R.E. was 0.00 volts, a fact which indicated lithium-metal deposition. In contrast to this, cells which contained Ca(AlCl$_4$)$_2$ electrolyte showed cathodic potentials higher than 30 volts even at a c.d. of 0.5 mA cm$^{-2}$ (on a stainless-steel electrode). The cathodic overpotentials on tungsten were somewhat lower; however, they exceed 15 volts at a current density of 0.5 mA cm$^{-2}$. At current densities of 10 and 20 mA cm$^{-2}$ rapid gas evolution was observed. It was found that after 5 minutes of electrolysis at 2 mA cm$^{-2}$, the O.C.V. remains above zero volts vs. Ca,R.E. for seven minutes. This may indicate some deposition of calcium on the stainless-steel cathode. To check this phenomenon, ten deposition tests were carried out with stainless-steel electrodes, having an area of 7-10 cm$^2$ each. The electrolysis was performed inside a glove box at a c.d. of 2 mA cm$^{-2}$, for 110-140 minutes. When the current was turned off, the stainless-steel was immediately disconnected from the cell, washed in thionyl chloride and transferred to a glass tube with a Teflon "Rotaflo" stopcock. The tube was taken out of the glove box and connected to a vacuum line. After the vacuum in the tube reached $4\times 10^{-4}$ torr the stainless-steel substrate was directly dropped into 100 cc of distilled water. Upon immersion of the stainless-steel substrate in the water, gas evolution was observed and the pH changed from about 6 to 10.2-10.6, depending on the total charge which had been passed in the particular electrolysis. According to these results it seemed that small quantities of calcium did deposit from Ca(AlCl$_4$)$_2$ solution.

If one assumes that calcium was the only metal deposited on the stainless-steel cathode, the Faradaic efficiency for calcium deposition, calculated from these pH changes is only $(7\pm2)\%$.

Similar tests performed after electrolysis in LiAlCl$_4$ solution showed a Faradaic efficiency of 80–90% for deposition of lithium.

Summary of safety tests

It was shown that the lithium cation is readily reduced on carbon, calcium, or stainless-steel cathodes. In all these cases the cathodic overpotentials are relatively low regardless of the type of the substrate. The deposition of Li on the calcium electrode is clearly identified by the OCV after the charging test. This OCV is 3.65–3.7 V, which is characteristic for the Li/SOCl$_2$ cell. Also, cathodically polarized calcium or stainless-steel immersed in LiAlCl$_4$ solution showed OCV of 0.00 V vs. a Li. R.E. The OCV, after a reversal test on a Ca/LiAlCl$_4$ cell is $-0.5$ to $-0.6$ V, which is the difference between the potentials of calcium anode and the lithium-coated cathode.

Cells containing Ca(AlCl$_4$)$_2$ electrolyte behaved in a basically different manner on charging or overdischarging, from cells which contained LiAlCl$_4$ electrolyte. Relatively high cathodic overpotentials were determined on calcium, passivated carbon, stainless-steel and tungsten electrodes, when these substrates were cathodically polarized in Ca(AlCl$_4$)$_2$—SOCl$_2$ solution. On charging Ca/Ca(AlCl$_4$)$_2$ cells no practical current could be observed up to a charging voltage of about 40 V. The same behavior was observed when stainless-steel was cathodically polarized in a solution which contained Ca(AlCl$_4$)$_2$ electrolyte (FIG. 6). The reverse cell voltage of fully discharged cells was found to be 10–40 V at a c.d. of 0.5 mA cm$^{-2}$ (the reverse voltage depends on the rate at which the cell was discharged before the reversal-FIG. 5). At current densities above about 2 mA cm$^{-2}$, evolution of SO$_2$ was observed. All these experimental results point out the principal difference between the reduction mechanism of calcium and lithium-based electrolytes.

It was found that on prolonged electrolysis at a current density of 2 mA cm$^{-2}$, some calcium was deposited on a stainless-steel electrode. Calcium deposition was also partially confirmed by measurements of the OCV of the cathode vs. a Ca.R.E., on electrolysing Ca(AlCl$_4$)$_2$ solution. However, it should be remembered that the 5–9% Faradaic efficiency for calcium deposition was obtained only at a cathodic overpotential of about 40 volts, which is very high.

All these results lead to the conclusion that in a calcium-thionyl chloride cell, LiAlCl$_4$ is inferior to Ca(AlCl$_4$)$_2$ as an electrolyte, since it might create hazardous conditions similar to those in the high-rate lithium thionyl chloride cell.

We claim:
1. An electrochemical cell resistant to abusive charging and over-discharging comprising in combination:
an alkaline earth metal anode selected from the group consisting of calcium, magnesium and from dischargeable alloys thereof, essentially free of alkali metals, a porous inert current collector, a liquid cathode in contact with said anode and current collector comprising an inorganic oxyhalide wherein there is dissolved a soluble calcium salt, forming a conductive solution with said solvent.
2. A cell according to claim 1 wherein the anode is made of essentially pure calcium.
3. A cell according to claim 1 wherein the liquid cathode is thionyl chloride.
4. A cell according to claim 1 wherein the current collector is made from teflon bonded carbon.
5. A cell according to claim 1, wherein the liquid cathode contains from 1 volume-% to saturation sulfur dioxide.
6. A cell according to claim 1, wherein the electrolyte salt is Ca(AlCl$_4$)$_2$.
7. A cell according to claim 6, wherein the concentration of the calcium aluminum chloride is from 0.5 M and 1.5 M.
8. A cell according to claim 1, wherein the anode and current collector are separated by a suitable spacer and rolled into a cylindrical or helical configuration.
9. A cell according to claim 1, wherein the calcium is annealed at 450°–750° C. prior to cell assembly.
10. A cell according to claim 1, comprising a plurality of parallel anodes and current collectors.

* * * * *